United States Patent [19]

Chausse et al.

[11] 4,431,957

[45] Feb. 14, 1984

[54] METHOD AND APPARATUS FOR GENERATING SIGNALS REPRESENTING MOTOR FLUX IN AN AC MOTOR

[75] Inventors: B. Paul Chausse, Roanoke, Va.; John D. D'Atre, Ballston Lake, N.Y.

[73] Assignee: General Electric Company, Salem, Va.

[21] Appl. No.: 335,344

[22] Filed: Dec. 29, 1981

[51] Int. Cl.$^3$ .............................................. H02P 5/40
[52] U.S. Cl. ................... 318/805; 318/803; 318/798
[58] Field of Search ............... 318/803, 805, 807–811, 318/798, 806

[56] References Cited

U.S. PATENT DOCUMENTS

| | | | |
|---|---|---|---|
| 3,907,687 | 9/1975 | Abbondanti | 318/805 |
| 4,088,934 | 5/1978 | D'Atre et al. | |
| 4,230,979 | 10/1980 | Espelage et al. | 318/721 |
| 4,245,181 | 1/1981 | Plunkett | 318/805 |
| 4,338,559 | 6/1982 | Blaschke et al. | 318/805 |

*Primary Examiner*—David Smith, Jr.
*Attorney, Agent, or Firm*—Arnold E. Renner; Ormand P. Austin

[57] ABSTRACT

Flux signals suitable for use in a control of an ac motor are generated as a function of the voltages and currents furnished to the motor. From sensed values of motor phase voltages and currents, signals representing the direct and quadrature values of motor voltage and current as well as total motor current are developed. Employing a closed loop path, these signals are utilized to develop signals representing the direct and quadrature components of the value of motor flux. The closed path develops a resistance signal representing the instantaneous motor resistance as a function of the total motor current and flux which resistance signal is employed in the development of the various flux signals.

11 Claims, 2 Drawing Figures

METHOD AND APPARATUS FOR GENERATING SIGNALS REPRESENTING MOTOR FLUX IN AN AC MOTOR

BACKGROUND OF THE INVENTION

The present invention relates generally to motor control systems and more particularly to a method and apparatus for developing signals representing the value of motor flux through the sensing of motor voltages and currents.

Many control systems for alternating current (ac) motors employ signals which are proportional to motor flux. Examples of this include U.S. Pat. Nos. 4,230,979 "Control Current Inverter and Motor Control System", by P. M. Espelage et al, issued Oct. 28, 1980 and 4,088,934 "Means For Stabilizing A-C Electric Motor Drive System", by J. D. D'Atre et al, issued May 9, 1978. Many other examples could be cited. In some instances, only the total motor flux is required for control. In other instances, the direct and quadrature components of the flux are used, at least in an intermediate sense, for use in developing other control signals such as those representing torque, slip and internal power factor. In this regard, 4,088,934 patent is again cited as an example as is co-pending application Ser. No. 332,180 for "Twelve-Pulse Operation of a Controlled Current Inverter Motor Drive" by J. H. Culter et al, Dec. 18, 1981.

In most instances the development of flux signals does not present a significant problem. Flux sensors can be used, as can additional sensors for motor torque, etc. In certain situations, however, the use of such additional sensors creates serious expense and problems. As an example, in the normal excavating shovel, the motor(s) which are used to propel the equipment are located adjacent the propelling equipment (e.g., treads) while the basic power supply and control therefor are located in the cab which is pivotable with respect to the propelling equipment. As such, all electrical connections to the motor are normally made through slip rings. Such slip rings not only represent an initial extra expense, but their maintenance, in the extremely hostile environment to which excavating shovel is exposed, is considerable. This maintenance problem is particularly pronounced in the low power level situations which exist with low power feedback signals such as would be derived from "flux coils" located in the motor.

One well known method of obtaining a signal representative of motor flux, when so-called flux coils are not used, is to integrate the term, motor terminal volts minus the current times resistance (IR) drop of the motor. While the resistance of a particular motor can be readily measured when the motor is not running, it must be remembered that the motor resistance will vary with temperature and, perhaps, with aging of the motor. Practical, reliable means to measure motor resistance under operating conditions are not readily available.

The need for an accurate indication of motor resistance, if the integrating method of determining motor flux is to be used, is apparent when it is realized that in most controls, if the value used for the resistance is too low, the motor control may limit the load torque to a value less (e.g., to one-half) of that actually permitted. Conversely, if the resistance value used is higher than the actual resistance, not only will the torque be incorrect, but the motor control man rapidly become unstable. The consequences of the latter situation are readily apparent and the difficulties associated with the first becomes so when it is realized, that in many circumstances such as the shovel use earlier indicated, the motor must deliver full rated torque at low speeds.

SUMMARY OF THE INVENTION

It is, therefore, an object of the present invention to provide improved apparatus and method for developing signals representative of the flux in an ac motor.

It is a further object to provide a system for developing signals proportional to motor flux through the sensing of motor terminal voltage and motor current.

It is another object to provide a method and apparatus for developing signals representing motor flux, and components thereof, through the sensing of terminal voltages and motor currents.

It is a still further object to provide a method or apparatus for developing signals representing flux, and components thereof, which does not require sensing of flux directly but through the generation of a signal representative of motor resistance by sensing motor voltages and currents.

The foregoing other objects are achieved, in accordance with the present invention, by providing for use in an ac motor control system the sensing of motor terminal voltages and the individual phase currents delivered to a polyphase ac motor. From these sensed values, intermediate signals representing the direct and quadrature components of the terminal voltage, the direct and quadrature components of the motor current and the total motor motor current are developed. Through the use of these intermediate signals, a signal proportional to the instantaneous motor resistance is generated and this signal is, in turn, used in conjunction with the foregoing intermediate signals to develop signals representative of the motor flux using the basic known relationship that flux is proportional to the integral of the motor terminal voltage minus the IR motor drop.

BRIEF DESCRIPTION OF THE DRAWING

While the present invention is defined in particularly in the claims annexed to and forming a part of this specification, a better understanding can be had from the following description taken in conjunction with the accompanying drawing in which:

DETAILED DESCRIPTION

Figure 1:
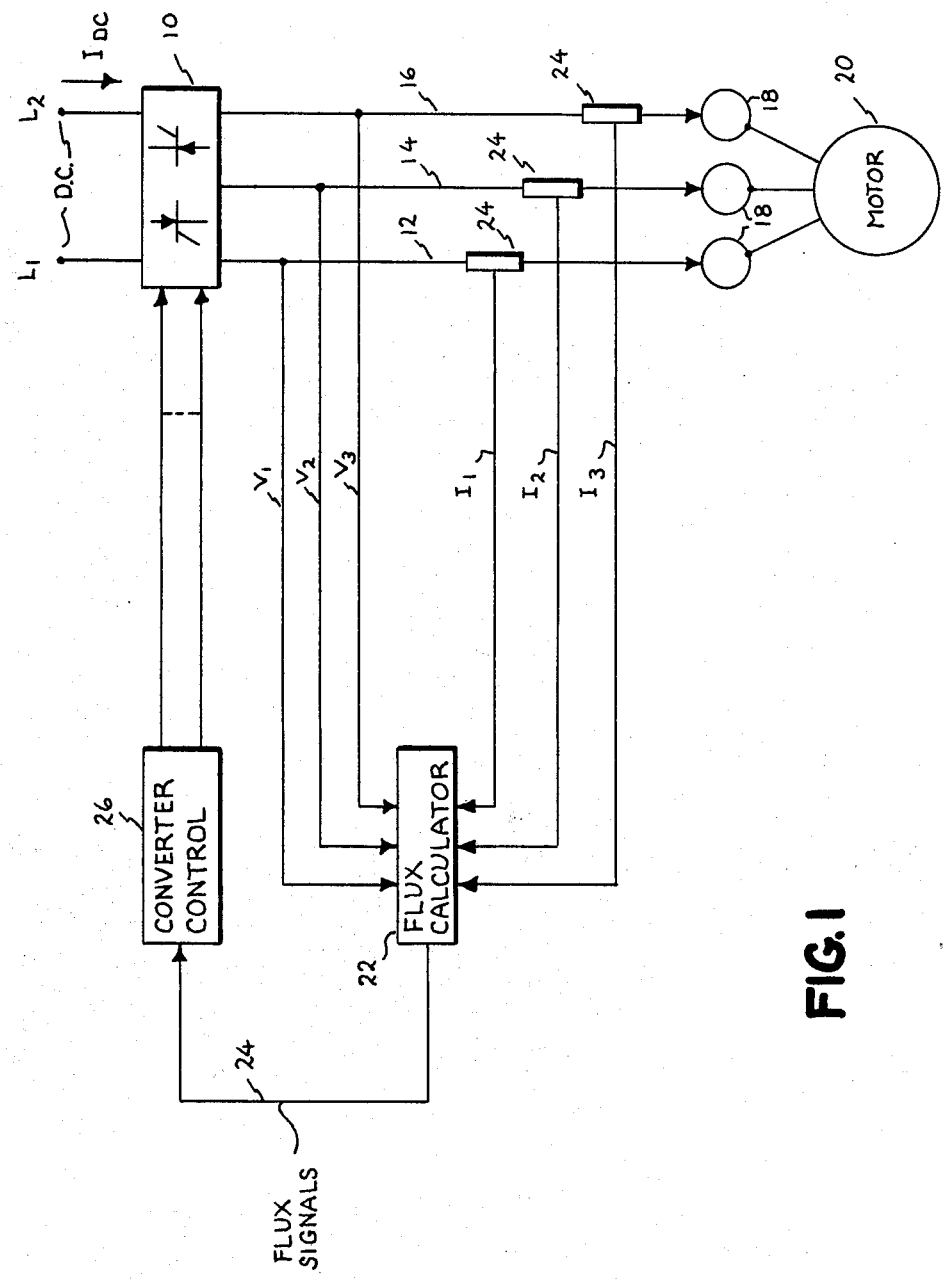
FIG. 1 is a high level block diagram illustrating a basic ac motor control system demonstrating an environment for present invention; and, FIG. 2 is a schematic diagram illustrating, in analog form, the present invention in its preferred embodiment.

FIG. 1 illustrates in high level block form a typical environment within which the present invention may be utilized. As shown in FIG. 1, a dc source of any suitable type, represented by the terminals $L_1$ and $L_2$, serves to supply a dc current ($I_{dc}$) to a power converter 10. The exact nature of the dc source is not of major importance to the present invention and it may supply either a constant dc current or variable dc current in accordance with the overall system. In the case of a variable dc current, the dc source may be, for example, a chopper circuit, supplied from a constant dc potential, operated in time ratio control. More commonly, however, the source would be a phase controlled rectifier bridge connected to an ac source and serving to supply a variable dc current as a function of the control of that rectifier in a manner known in the art. Similarly, the converter 10 details are not pertinent to the present invention but this converter would, most likely in the present state of the art, be a thyristor bridge which operates in the inversion mode and which serves to provide variable frequency ac power at its output as a function of input control signals. This type converter is customarily referred to as an inverter and is also well known in the art.

The output of the converter 10, shown in FIG. 1 as a three-phase output, is applied by way of lines 12, 14 and 16 to an ac motor 20 by way of slip ring power connections 18. The three line voltages on lines 12, 14 and 16 are supplied to a flux calculator 22 and are represented in FIG. 1 as the three voltage signals $V_1$, $V_2$ and $V_3$. The currents in each of the three phase lines 12, 14 and 16 are sensed by suitable current sensors 24 to provide current signals $I_1$, $I_2$ and $I_3$ to the same flux calculator 22. The current sensors 24 are, in the illustrated embodiment, preferably low resistance shunts since one of the anticipated primary applications of this invention requires the motor 20 to be operated at low speeds. It is apparent that in other instances other current sensors such as current transformers could be employed.

The flux calculator 22 constitutes the present invention and will be described in detail with respect to FIG. 2. Suffice it to say at the present time that the calculator supplies on its output 24 the flux signal(s) which are required for the operation of a suitable converter control 26. The exact nature of the converter control 26 is not critical to the present invention and would, of course, be determined by the nature of the converter 10. As an example, however, if converter 10 is a controlled current inverter, control 26 could be that which is described in the aforementioned U.S. Pat. No. 4,230,979 which patent is specifically incorporated hereinto by reference.

Figure 2:
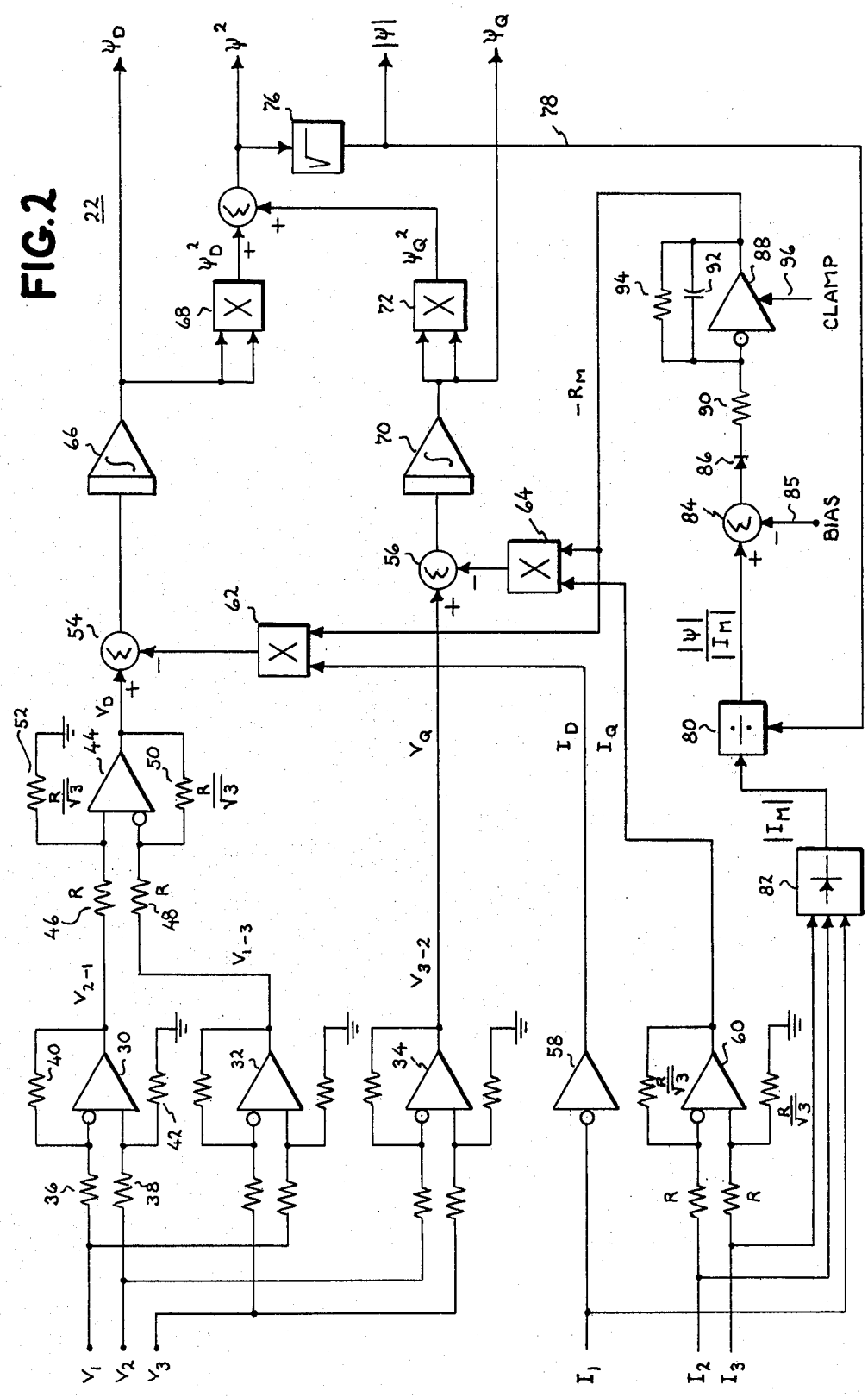

Flux calculator 22 is illustrated in detail in FIG. 2. Although the FIG. 2 depiction is in analog form, it will be readily apparent to those skilled in the art that digital implementation employing suitable microprocessors (or other processing units) could be employed to achieve the desired results with equal facility. Referencing now FIG. 2, the three voltage signals $V_1$, $V_2$ and $V_3$ serve as inputs to three operational amplifiers 30, 32 and 34 which are connected in the substracting mode. The $V_1$ signal is applied via a suitable input resistor 36 to the inverting input of operational amplifier 30. The $V_2$ signal is applied via input resistor 38 to the non-inverting input of that operational amplifier which input is further tied to ground by way of a resistor 42. A feedback resistor 40 is connected between the output of operational amplifier 30 and its inverting input such that its output is the difference between its two input signals; i.e., the signal $V_{2-1}$. Typically in this kind of arrangement, the resistors 36 and 38 would be of the same value and resistors 40 and 42 would also be of equal value but of approximately one-hundreth the value of the resistors 36 and 38. Operational amplifiers 32 and 34 have similar associated circuitry and a detailed explanation here is believed unnecessary. Briefly, however, the $V_3$ signal forms the input to the inverting input of operational amplifier 32 and the $V_1$ signal forms the input to the non-inverting input such that the output of amplifier 32 is the difference between $V_1$ and $V_3$ ($V_{1-3}$). In a similar manner, the $V_2$ signal forms an input to the inverting input of operational amplifier 34 and the $V_3$ signal is applied to its non-inverting input such that its output is a signal $V_{3-2}$. The output of operational amplifier 34 is also representative of the quadrature component of the motor voltage and is indicated as $V_Q$.

The $V_{2-1}$ signal from operational amplifier 30 is applied by way of a suitable input resistor 46 to the non-inverting input of an operational amplifier 44, which non-inverting input is also tied to ground by way of a resistor 52. The output of operational amplifier 32 ($V_{1-3}$) is applied by way of a resistor 48 to the inverting input of the amplifier 44 and there is further included a feedback resistor 50 which connects the output of that operational amplifier to its inverting input. In this situation resistors 46 and 48 would be of equal value, represented by R, and resistors 50 and 52 would have a proportional value represented by $R/\sqrt{3}$. The output of operational amplifier 44 is a signal designated $V_D$ which is the direct component of the motor voltage. The $V_D$ signal is supplied in a positive sense to a suitable summing junction 54 while the $V_Q$ signal from operational amplifier 34 supplied, in a positive sense, to a summing junction 56.

The $I_1$ signal is supplied to the inverting input of an operational amplifier 58 connected in the inverting mode such that its output is a signal $I_D$ representing the direct component of motor current. The $I_2$ signal is supplied to the inverting input of an operational amplifier 60 by way of a suitable resistor while the $I_3$ signal is supplied to the non-inverting input of that operational amplifier. Operational amplifier is connected in the same manner as is operational amplifier 44 with respect to its associated circuit components. The output of operational amplifier 60 is a signal representing the quadrature component of the motor current, $I_Q$.

The $I_D$ signal from amplifier 58 forms one input to a suitable multiplier 62, a second input being a signal designated $-R_M$ which is representative of the motor resistance, the generation of which will be later discussed. In a similar manner, the $I_Q$ signal is supplied as one input to a multiplier 64 having as its second input the $-R_M$ signal.

The output of multiplier 62 represents the product of the direct component of motor current and the motor resistance and is applied, in negative sense, to summing junction 54. The output of that summing junction is furnished to a suitable integrating circuit 66 such that the output of circuit 66 represents the motor flux attributable to the direct power components of the motor. This signal, designated, $\psi_D$, serves as one usable output of the flux calculator 22. The output of integrator 66 is also applied as both inputs to a multiplier 68 such that the output of that multiplier is the square of the $\psi_D$ signal ($\psi_{D2}$). In a manner similar to that just described, the output of multiplier 64 is applied in the negative sense to summing junction 56, the other input of which is the $V_Q$ signal. The output of summing junction 56 is applied to an integrator 70 such that its output is representative of the quadrature component of flux, $\psi_Q$. The $\psi_Q$ output is applied to the two inputs of a multiplier 72 which provides as its output the square of the quadrature flux signal, ($\psi_{Q2}$). The outputs of the two multipliers 68 and 72 are each furnished in the positive sense to a summing junction 74 which, therefore, provides an output proportional to the square of the motor flux, $\psi^2$. The $\psi^2$ signal is applied to a suitable function block 76 which provides a square root function such that its output is equal to the absolute magnitude of motor flux, that is, $|\psi|$.

The $|\psi|$ signal is applied via line 78, to a divider 80 the second input of which is signal proportional the absolute magnitude of the motor current, $|I_M|$. The $|I_M|$ signal is shown as being derived as the output of a rectifier 82 which has as its inputs the three phase current signals $I_1$, $I_2$ and $I_3$. As such, the output of divider 80 is a ratio signal proportional to the ratio of the absolute magnitude of the flux to the absolute magnitude of the current. This is a signal which can determine that the $-R_M$ signal is low, as a fixed control strategy can only obtain a certain flux from a given amount of current. The $-R_M$ signal is increased negatively by the following circuitry. This ratio signal is furnished in the positive sense to a summing junction 84 which also receives, by way of line 85, a bias signal from an external source. This bias signal has a value representative of the anticipated value of the ratio signal. The bias signal may be generated in a variety of ways since over the full range of motor operation it is a hyperbolic function. In its simplest form, however, the bias signal may be approximated in the range where the present invention is most applicable; i.e., greater than fifty percent of maximum operating current, as a function of the total motor current $|I_M|$ as defined by the expression:

$$\text{Bias} = K_1 + K_2 |I_M|$$

wherein $K_1$ and $K_2$ are constants which may be emperically derived. The output of summing junction 84 will, therefore, be an error signal which varies in accordance with the deviation of the actual ratio from the anticipated ratio. This error signal is applied by way of a suitable diode 86 and an input resistor 80 to the inverting input of an operational amplifier 88 which is connected in the integrating mode. In this regard there is connected between the output of the amplifier 88 and its inverting input the parallel combination of a capacitor 92 and a resistor 94 such that this integrator further includes a slow time constant decay. As further illustrated, a clamp signal from an external source is applied to the operational amplifier 88 by way of line 96. This signal has a value proportional to the cold resistance of the particular motor being utilized and its value can be derived by measurement. This clamp signal serves to assure that the output signal of amplifier 88, the $-R_M$ signal earlier discussed, does not fall below that of the cold resistance in the motor. The $-R_M$ signal will vary, therefore, above the clamped value in accordance with the error in the flux/current ratio to provide the resistance signal to the two multipliers 62 and 64. With motor operation and its attendant temperature variation the $-R_M$ signal will vary in accordance with and in approximation of the actual resistance change to thus provide at the outputs of circuit 22 accurate representations of the various motor flux signals, $\psi_D$, $\psi_Q$, $|\psi|$ and $\psi^2$. Any or all of these signals which may be utilized in accordance with the requirements of the overall control system.

While there has been shown and described what is at present considered to be the preferred embodiment of the present embodiment of the present invention, modifications thereto will readily occur to those skilled in the art. As earlier mentioned, although the invention as illustrated in analog form, it is readily apparent that digital implementation of the apparatus and method of the present invention could be employed with the facility. In addition, although a three-phase system has been illustrated, the present invention has equal applicability to any polyphase system. It is not desired, therefore, that the invention be limited to specific arrangement as shown and described and it is intended to cover in the appended claims all such modifications as fall within the true spirit and scope of the invention.

What is claimed is:

1. A system for deriving a signal proportional to motor flux of an alternating current motor provided with electrical power from a polyphase alternating current power source comprising:
   (a) means to develop voltage signals representing the direct and quadrature components of the voltage supplied to said motor from said source;
   (b) means to develop current signals representing the direct and quadrature components of the current supplied to said motor from said source;
   (c) means to develop a total current signal representing the total current supplied to said motor from said source;
   (d) means to supply a bias signal proportional to the anticipated ratio of the absolute value of motor flux to the absolute value of total motor current; and,
   (e) means responsive to said voltage signals, said current signals, said total current signal and said bias signal to develop a flux signal proportional to motor flux, including means responsive to said total current signal and said flux signal to develop a signal employed to correct the motor resistance used in developing said flux signal.

2. The invention in accordance with claim 1 wherein said last recited means includes means for providing a ratio signal having a value proportional to the ratio of the absolute magnitude of said flux signal to the absolute magnitude of said total current signal and integrating means responsive to said ratio signal for developing a resistance signal representing the instantaneous value of motor resistance for use in developing said flux signal.

3. The invention in accordance with claim 1 wherein said last recited means includes:
   (a) means for providing a ratio signal having a value proportional to the ratio of the absolute magnitude of said flux signal to the absolute magnitude of said total current signal;
   (b) combining means for combining said ratio signal with an externally supplied signal having a value corresponding to the anticipated value of said ratio signal to develop a combined signal; and,
   (c) integrating means responsive to said combined signal for generating a resistance signal representative of the instantaneous value of motor resistance for use in developing said flux signal.

4. The invention in accordance with either claim 2 or claim 3 further including means for supplying an external clamp signal to said integrating means whereby the output of said integrating means is held at a minimum value representing cold resistance of said motor.

5. A system for deriving a signal proportional to motor flux for use in the control of an alternating current motor provided from a polyphase alternating current power source comprising:
   (a) means to develop first and second voltage signals representing, respectively, the direct and quadrature components of the terminal voltage furnished to the motor from the power source;
   (b) means to develop first and second current signals representing, respectively, the direct and quadrature components of current furnished to the motor from the power source;

(c) means to develop a third current signal proportional to the total current furnished to the motor from the power source; and, (d) means to develop signals, including a total flux signal, proportional to motor flux as functions of said first and second voltage signals and said first, second and third current signals comprising;

(1) means to develop a resistance signal proportional to the instantaneous motor resistance as a function of said third current signal and said total flux signal, (2) means responsive to said first voltage signal said first current signal and said resistance signal to develop a direct flux signal proportional to the direct component of motor flux;

(3) means responsive to said second voltage signal and said second current signal and said resistance signal to develop a quadrature flux signal proportional to quadrature component of motor flux, and, (4) means responsive to said direct and quadrature flux signals to develop said total flux signal proportional to total motor flux.

6. The invention in accordance with claim 5 wherein said means for producing said resistance signal includes:

(a) means for providing a ratio signal having a value proportional to the ratio of the absolute magnitude of said total flux signal to the absolute magnitude of said total current signal;

(b) combining means for combining said ratio signal with an externally supplied signal having a value corresponding to an anticipated value of said ratio signal to develop a combined signal; and, (c) integrating means responsive to said combined signal for generating a resistance signal representative of the instantaneous value of motor resistance for use in developing said flux signal.

7. The invention in accordance with claim 6 further including means for supplying an external clamp signal to said integrating means whereby the output of said integrating means is held to a minimum value representing the cold resistance of said motor.

8. A method for deriving a signal proportional to motor flux in an alternating current motor provided with electrical power from a polyphase alternating current source comprising:

(a) developing voltage signals representing direct and quadrature components of the voltage supplied to said motor from said source;

(b) developing current signals representing the direct and quadrature components of the current supplied to said motor from said source;

(c) developing a total current signal representing the total current supplied to said motor from said source;

(d) providing a bias signal representing the anticipated ratio of the absolute value of motor flux to absolute value of motor current; and, (e) generating in response to said voltage signals said current signals and said total signal\a flux signal proportional to motor flux including the step of developing a signal proportional to instantaneous motor resistance as a function of said total current signal and said flux signal, said signal representing instantaneous motor resistance for utilization in the development of said flux signal.

9. The invention in accordance with claim 8 wherein the step of developing said flux signal includes the steps of:

(a) developing a ratio signal proportional to the ratio of the absolute magnitude of the flux signal to the absolute magnitude of said current signal;

(b) modifying said ratio signal by an externally supplied bias signal having a value corresponding to the anticipated value of said ratio signal to provide a modified ratio signal; and, (c) integrating said modified ratio signal to develop a resistance signal representing the instantaneous value of a motor resistance for use in developing said flux signal.

10. The invention in accordance with claim 9 further including the step limiting the integrating step to a minimum value representing the cold resistance of the motor.

11. A method for deriving signals proportional to motor flux for use in the control of an alternating current motor provided power from a polyphase alternating current source comprising steps;

(a) developing first and second voltage signals representing, respectively, the direct and quadrature components of the terminal voltage furnished to the motor from said source;

(b) developing first and second current signals representing respectively, the direct and quadrature components of the current furnished to the motor from said source;

(c) developing a third current signal proportional to total current furnished to the motor from said source; and, (d) developing signals, including a total flux signal, proportional to motor flux as a function of said first and second voltage signals and first, second and third current signals comprising;

(1) developing a resistance signal proportional to instantaneous value of the motor resistance as a function of said third current signal and said total flux signal;

(2) developing a direct flux signal proportional to the direct component in motor flux as a function of said first voltage signal, said first current signal and said resistance signal;

(3) developing a quadrature flux signal representing the quadrature component of motor flux as a function of said second voltage signal said second current signal and said resistance signal, and, (4) developing a total flux signal proportional to total motor flux as a function of said direct and quadrature flux signals.

* * * * *